United States Patent [19]

Plener et al.

[11] 4,040,102
[45] Aug. 2, 1977

[54] MAGNETIC TAPE DEVICE

[75] Inventors: Helmut Plener, Munich; Heinz Piotrowski, Olching; Otto Arweiler, Germering; Herbert Drexler, Neuesting, all of Germany

[73] Assignee: Uher Werke Munchen GmbH & Co., Munich, Germany

[21] Appl. No.: 628,746

[22] Filed: Nov. 4, 1975

[30] Foreign Application Priority Data

Sept. 26, 1975 Japan .................... 50-116287

[51] Int. Cl.² .............. G11B 15/43; G11B 15/24; B65M 17/22; B65M 59/38
[52] U.S. Cl. .................... 360/71; 226/90; 226/91; 226/189; 242/190; 360/90; 360/130
[58] Field of Search .......... 360/71, 90, 95, 130, 360/137; 242/190, 75.52; 226/90, 91, 168, 186, 189

[56] References Cited

U.S. PATENT DOCUMENTS

| 2,538,893 | 1/1951 | Begun | 360/130 |
|---|---|---|---|
| 3,083,925 | 4/1963 | Schoebel | 242/194 |
| 3,244,954 | 4/1966 | Branco | 242/75.52 |
| 3,286,943 | 11/1966 | Morimoto | 360/90 |
| 3,731,890 | 5/1973 | Ruoff et al. | 242/75.52 |
| 3,787,690 | 1/1974 | Neff | 242/190 |
| 3,864,742 | 2/1975 | Katom | 360/95 |
| 3,921,215 | 11/1975 | Asami | 360/71 |

Primary Examiner—Robert S. Tupper
Attorney, Agent, or Firm—Fleit & Jacobson

[57] ABSTRACT

The invention relates to a magnetic tape device which includes a first control member, a motor for moving the first control member between two operating positions, adjusting members movable by the first control member for moving the tape guide means between two operating positions in dependence upon the first control member, said two operating positions comprising a first operating position in which the tape can be stopped and rapidly wound forward or in reverse by the motors for driving the spool supporting means and in which the tape can be moved rectilinearly past the magnetic heads and capstan without contact therewith and a second operating position in which the tape can be moved rectilinearly past the magnetic heads and capstan without contact therewith and a second operating position in which the tape is guided by the guide means and lies against the magnetic heads for recording or reproducing and is engaged with the capstan, a second control member arranged to be moved by the motor which moves the first control member for releasing the brake of one of the spool supporting means while the tape guide means are being moved between their two operating positions.

16 Claims, 11 Drawing Figures

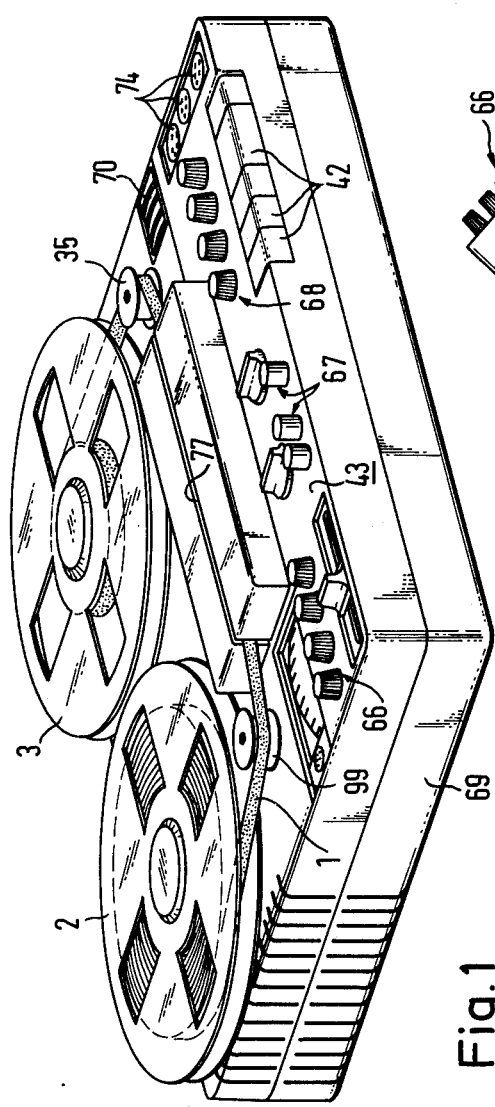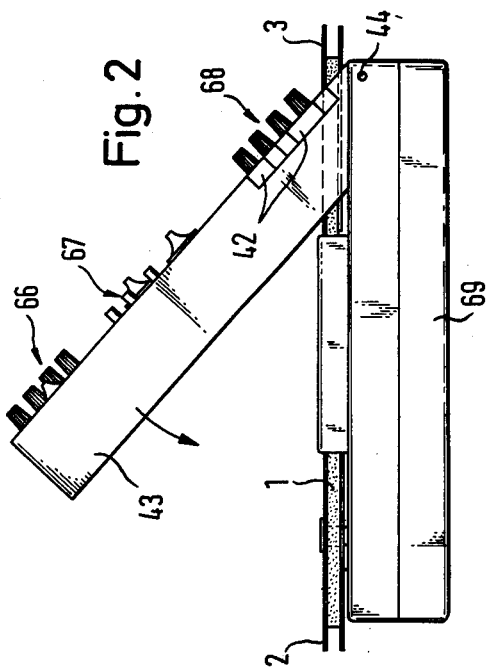

4,040,102

MAGNETIC TAPE DEVICE

BACKGROUND OF THE INVENTION

In the case of magnetic tape devices, in particular sound tape devices, for the purposes of achieving good synchronism of the magnetic tape during the reproducing and recording operations, it is known for the magnetic tape to be pressed against a capstan, at the side which is provided with the magnetisable coating, by means of a pressure roller. The capstan is usually connected to an inertia mass, and the pressure roller is operated for example by a magnet. Actuation of the magnet causes the pressure roller to be lifted off, for example for rapid forward and return wind, so that the sound tape can be wound on at high speed. A disadvantage with such devices is that when the sound tape is brought into contact with the capstan an additional device, namely a magnet and a pressure roller, are required. There is also the danger that the magnetisable coating on the magnetic tape may be damaged by the mechanical loading when the pressure roller presses against it, for example by the formation of scratches and the like. In addition, because the sound tape is pressed against the capstan shaft by means of the pressure roller, the magnetic tape is subjected to a pummeling effect so that folding can occur, particularly at the two edges of the magnetic tape.

In relation to magnetic tape devices, in particular sound tape devices, a distinction is essentially made between two operating positions of the deflection or tape guide means. In one operating position, the so-called start position, the device can be set to recording or reproducing operation, or rapid stop. In this position the magnetic tape is in contact with the capstan for tape transportation. In addition, the magnetic tape lies against the magnetic heads. In the other position, the stop or rewind position, the device can be set to rapid forward or return wind or to stop. In this operating position the magnetic tape is lifted both from the capstan shaft and from the magnetic heads.

SUMMARY OF THE INVENTION

This invention relates generally as indicated to a magnetic tape device, in particular a sound tape recording and/or reproducing device.

An object of the present invention is to provide a magnetic tape device, in particular a sound tape device, in which the change between the two operating positions just mentioned above can be precisely carried out, and wherein the magnetic tape can be brought into transporting contact with the capstan shaft without the use of a pressure roller.

According to the present invention there is provided a magnetic tape device comprising two tape spool supporting means, motors for driving the spool supporting means, brake means for braking each spool supporting means, magnetic heads for recording, reproducing and erasing information on the tape, guide means for guiding the tape past the magnetic heads, a capstan for said tape, a drive motor for driving the capstan, manually operable switches for setting the mode of operation of the device, a first control member, a motor for moving the first control member between two operating positions, adjusting members movable by the first control member for moving the tape guide means between two operating positions in dependence upon the first control member, said two operating positions comprising a first operating position in which the tape can be stopped and rapidly wound forward or in reverse by the motors for driving the spool supporting means and in which the tape can be moved rectilinearly past the magnetic heads and capstan without contact therewith and a second operating position in which the tape is guided by the guide means and lies against the magnetic heads for recording or reproducing and is engaged with the capstan, a second control member arranged to be wound by the motor which moves the first control member, and an adjusting member operated by the second control member for releasing the brake of one of the spool supporting means whilst the tape guide means are being moved between their two operating positions.

The tape guide means in the region of the capstan, which means cause the mgnetic tape to be looped around the capstan in a Ω-configuration, can be arranged pivotally about the capstan. Particularly suitable for this purpose is a disc which is rotatable about the capstan and which is simultaneously provided with a control surface against which adjusting elements in the form of pivotal levers lie. Arranged on the pivotal levers are deflection pins which can be pivoted from one operating position into the other operating position, upon rotation of the disc which is rotatable about the capstan.

For rotating the disc which is rotatable about the capstan, the shaft of themotor which drives it can be in the form of a geared motor, and can be provided with a gearwheell which drives the disc by way of an intermediate gearwheel.

In addition, the motor can also be employed to rotate the second control member which can also be in the form of a disc, while for facilitating adjustment of the disc serving as the second control member the disc can be secured to the motor shaft of the geared motor by way of a slipping clutch.

By means of the invention, simply by actuating the geared motor which is provided as a fourth motor besides the two tape winding motors and the drive motor for the inertia mass in the magnetic tape device, it is readily possible to cause pivotal movement of the tape guide means from one operating position into the other operating position, while the magnetic tape can be brought into transporting contact with the capstan shaft without employing a pressure roller, insofar as the magnetic tape is looped around the capstan shaft in a Ω-configuration. The invention has the advantage that the rear side of the tape comes into contact with the capstan shaft so that the magnetisable coating of the tape is not damaged by the transporting surface of the capstan shaft.

In addition, with the invention, two of the tape guide means can be so pivoted that the magnetic tape always runs at the same angle of approach to a guide element or a guide roller of a means for controlling and/or setting the tape tension, during the two operation positions.

As a result, there are the same structurally predetermined parameters for control of the tape tension or for setting the tape tension, both in the rewind mode and also in the recording or reproducing mode, The control parameter which is required for the tape tension control is obtained from the deflection of a guide element, such deflection being caused by the tape tension. For this purpose the guide element is carried on a shaft which has one end stationarily anchored while its free end can be deflected under the effect of the tape tension. Preferably the free end of the shaft is provided with a guide roller about which the magnetic tape is passed. The evaluated component of the deflection of the guide roller lies transversely to a straight line which is obtained from the line connecting the end points of two diagonals originating from the guide point of the tape. For this purpose one diagonal lies in an equal-sided parallelogram, of which two sides coincide with the tape path about the guide point of the sensing means, with a full tape spool. The other diagonal lies in an equal-sided parallelogram whose sides are of the same length as the first parallelogram and of which two sides coincide with the tape path, with an empty tape spool about the guide point of the sensing means.

The deflection of the shaft or the guide roller can be ascertained by means of capacitive, electromagnetic, or photoelectric transducers or by means of elongation measuring strips, piezoelectric crystals and the like. For example the shaft on which the guide roller is carried can be provided with a shield which moves into the light beam of a light source which is directed onto a photoelectric transducer, for example a phototransducer, which then delivers a corresponding electrical signal, in dependence on the depth of insertion of the shield into the light beam.

This arrangement provides control of the tape tension, with an extremely low error limit. Inspite of the changing tape spool diameter, both during the recording and reproducing mode and during rewind, this arrangement provides satisfactory control of the tape tension with a low error limit, while it involves a control of tape tension which is virtually travel-less.

The signal delivered by the transducer is applied to a control circuit which correspondingly controls the torque of the drive motor on the winding-on side. Associated with each of the two tape winding motors is a means for controlling or setting the tape tension. The control circuit which evaluates the signal supplied by the transducer is so constructed that it filters out high-frequency oscillations which result from the quasi "resilient" deflection of the guide element, from the elasticity of the sound tape and from the operation of the motor, and passes such oscillations to the motor such that the motor is subjected to alterations in torque which oppose the oscillations of the guide element. For this purpose, besides the circuit which transmits to the pulling motor the original signal which results solely from the tape tension, the control circuit also includes a compensation circuit which is connected in parallel to the first mentioned circuit and which transmits higher-frequency signals of the transducer, which signals then cause the motor to respond in the manner described.

In order to achieve satisfactory transportion of the sound tape by the capstan shaft without imparing and mechanically loading the magnetic tape, the sound shaft which is formed by a steel pin can be encased with a hard and smooth friction coating in the transportation region of the steel pin, the coating having a higher coefficient of friction relative to the magnetic tape material than steel. The friction coating can comprise for example polyurethane and can have a hardness of 95–98 Shore A. The surface of the friction coating is smooth, which can be provided in particular by grinding.

BRIEF DESCRIPTION OF THE DRAWINGS

To the accomplishment of the foregoing and related ends, the invention then comprises the features hereafter fully described and particularly pointed out in the claims, the following description and annexed drawings setting forth in detail a certain illustrative embodiment of the invention, this being indicative however of but one way in which the principle of the invention may be employed.

In said annexed drawings:

FIG. 1 shows a perspective view of a magnetic tape device according to the invention, FIG. 2 shows a view of the magnetic tape device of FIG. 1 from the front, with a structural component thereof pivoted upwardly, which component has in particular the press keys and setting means and the sound tape electronic assembly and the electronic assembly necessary for controlling the various modes of operation of the device.

DESCRIPTION OF THE PREFERRED EMBODIMENT

Figure 5:
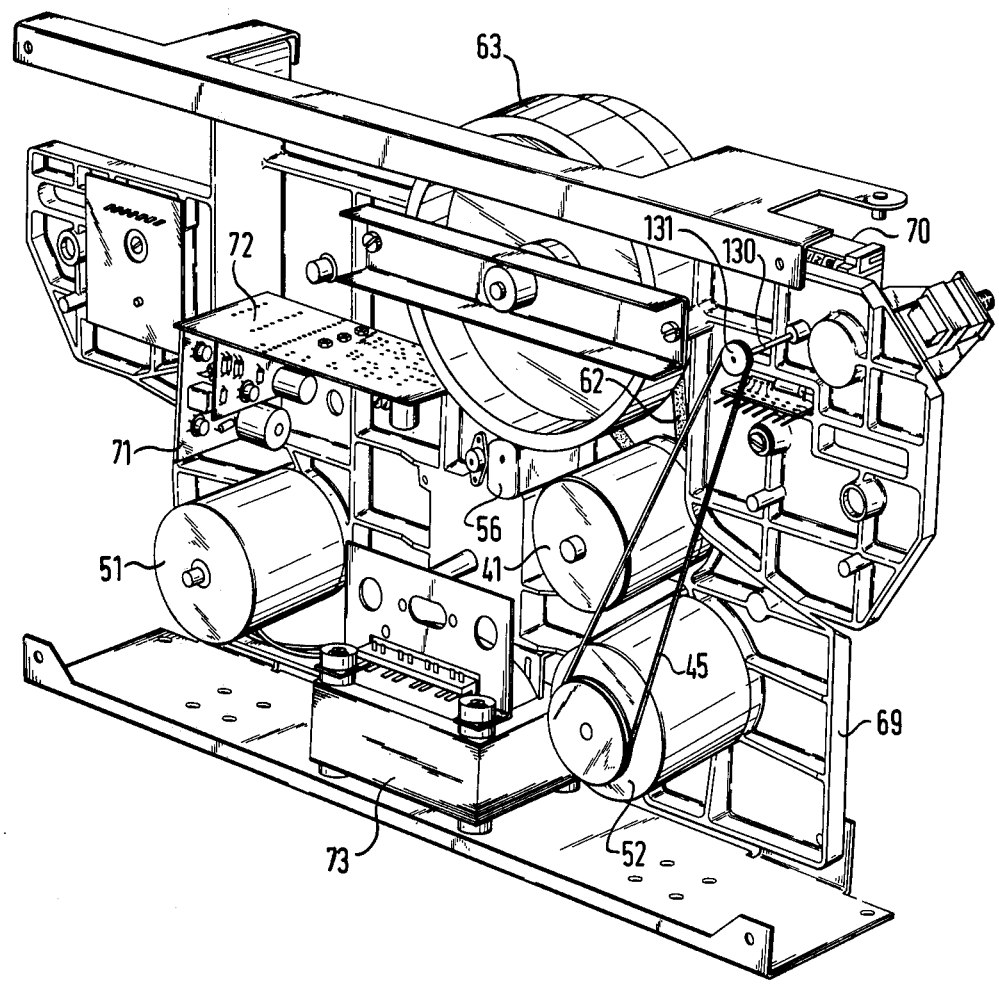
FIG. 5 shows the sound tape device of FIG. 1, with the lower housing member removed.

The drawings show a magnetic tape device, in particular a sound tape device, in which tape spools 2 and 3 (FIG. 1) are provided for winding on and winding off the magnetic tape 1. Each tape spool 2 and 3 is driven directly by an associated tape spool motor 51 and 52 (FIG. 5).

For guiding the magnetic tape 1 at magnetic heads 46, 47, 53, 78 and at a capstan shaft 13, there are tape guide means 54 and 55 and tape deflection means 5, 13a, 16, 20, 21, 49 and 50, which can be brought into two operating positions.

Figure 3:
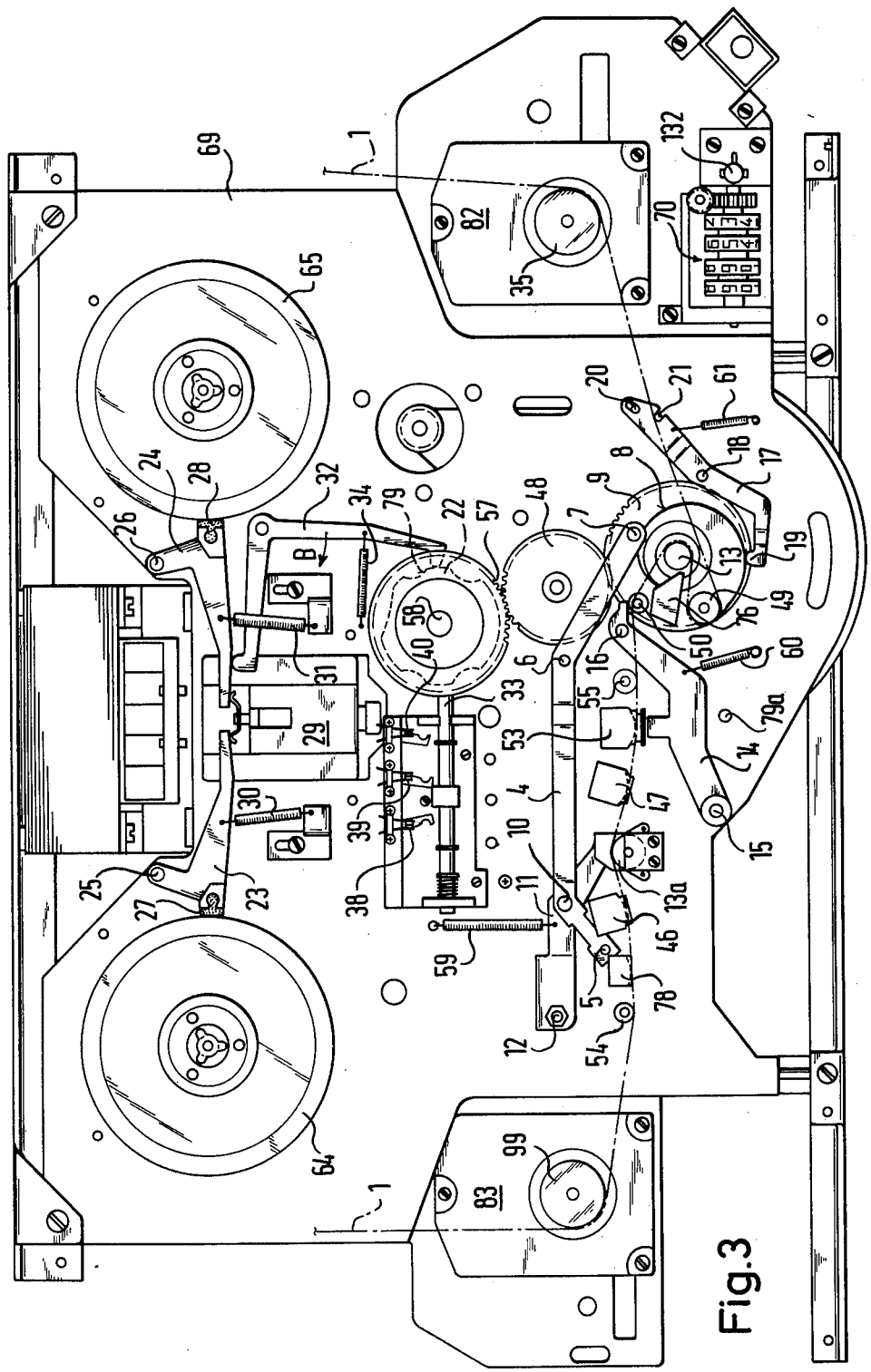
FIG. 3 shows a plan view of the magnetic tape device of FIG. 1 with the upper housing member removed, the tape guide means being set into the start position.
Figure 4:
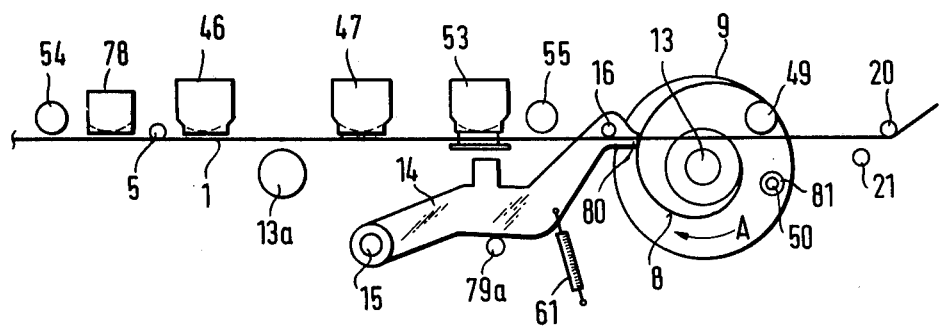
FIG. 4 shows a diagrammatic view of the position of the tape guide means in the stop or rewind position.

FIG. 3 shows the first operating position of the tape deflection means 5, 13a, 16, 20, 21, 49 and 50, being the so-called start position in which the device can be set for recording or reproducing or for rapid stop. The second operating position of the deflection means, as shown in FIG. 4, is the position for stop or rewind, that is to say, the device can then be set to rapid forward or reverse wind or in the stop position.

The deflection means can be switched over from one operating position to the other operating position by a control member which in the embodiment illustrated is in the form of a disc 9 with corresponding control surfaces, the disc 9 being rotatable about the capstan shaft 13. The control disc 9 can be rotated by means of a gearwheel 57 which is carried on a motor shaft 58 of the geared motor 56 (FIG. 5), and by means of an intermediate gear 48. Arranged on the control disc 9 are the tape deflection means 49 and 50, one deflection means being in the form of a deflection roller 49 and the other deflection means being in the form of a deflection pin 50.

Pivotal control levers 4 and 17 engage a control surface 8 of the control disc 9. Provided on one lever 4 at one end thereof, is the deflection means 5 which is in the form of a deflection pin. The lever 4 can be pivoted about an axis 6. The other end of the lever 4 is provided with a sensing element 7 which can slide along the control surface 8 on the disc 9. The lever 4 and thus also the pin 5 are pivoted in dependence on the configuration of the control surface 8.

Also provided on the lever 4 is a connecting pin 10 for connecting the lever 4 to a control lever 11. The control lever 11, which is a single-arm control lever, is pivotal about an axis 12 against the force of a spring 59 and at its free pivotal end carries the tape contact roller 13a forming a tape deflection means. The lever 11 is pivoted simultaneously with the pivotal movement of the lever 4, that is to say the movement or the position of the roller 13a is controlled by the control surface 8 on the disc 9.

In addition, the rotation of the control disc 9 which is rotatable about the capstan shaft 13 actuates a further lever 14 which is pivotal about an axis 15 against the force of a spring 60 and which at its forward end carries the tape deflection means 16 which is in the form of a deflection pin.

The third lever 17 is of a double-armed construction and is pivotal about an axis 18 against the force of a spring 61. A sensing element 19 which is arranged on one of the levers 17 lies against the control surface 8 of the disc 9. Arranged at the other end of the lever 17 are two deflection pins 20 and 21 between which the magnetic tape 1 is passed. The pin 21 is mounted on the lever 17 so as to be pivotal against the force of a spring (not shown) located at the underside of the lever 17.

Brake means (FIG. 3) are also provided for the tape spool discs 64 and 65 of the two tape spools 2 and 3. The brake means substantially coprise pivotal levers 23 and 24 which are pivotal about pivot axes 25 and 26 respectively against the force of respective springs 30 and 31. Brake linings 27 and 28 which are arranged at one end of the respective levers 23 and 24 can be pressed against the tape spool discs 64 and 65 by the forces of the two springs 30 and 31. They can be lifted away from the tape spool discs 64 and 65, against the force of the springs 30 and 31, by means of a solenoid 29.

The device also has a control disc 22 which can be driven also by the geared motor 56 and which has a control surface 79 against which lies an angled pivotal lever 32. The control disc 22 is non-rotatably connected to the motor shaft 58 of the motor 56. One of the brake means, in the illustrated embodiment the pivotal lever 24 or the associated brake lining 28, can be lifted from the spool disc 65 of the tape spool 2, by the pivotal lever 32. In order to be able to adjust the position of the control disc 22, the disc 22 can be connected to the motor shaft 58 for example by way of a slipping clutch.

A slider member 33 also lies against the control surface of the control disc 22, and switches 38, 39 and 40 can be correspondingly actuated by means of the slider member 33, depending on the particular position assumed by the control disc 22. Operation of the geared motor which moves the control disc 22 and simultaneously therewith also the control disc 9 into the corresponding positions is controlled by means of the press keys 42 (FIG. 1). This also applies as regards the tape spool motors 51 and 52 which drive the tape spools 2 and 3, and also as regards a motor 41 which drives the capstan shaft 13, and the inertia mass 63 which is non-rotatably connected to the capstan shaft 13, by way of a belt 62 (FIG. 5).

The pressure keys 42 are combined together in a structural unit 43 (see FIG. 2), together with the electronic assembly which is required for controlling the various modes of operation of the device (forward, reverse, stop, etc.), and the sound tape electronic assembly. The electrical circuits which are used for this purpose are known so that they will not be described in greater detail herein. Disposed in the structural unit 43 are also the setting means 66, 67 and 68 for sound volume, tone control, high pitches, low pitches, and the like, and sockets 74. As shown in FIG. 2, the structural unit 43 is pivotally mounted on the chassis 69 of the device. The unit 43 can be locked in the pivoted-open position, as shown in FIG. 2. The pivot axis is denoted by reference 44. As shown in FIG. 2, the pivotal movement is perpendicularly to the plane in which the tape spools 2 and 3 lie. Maintenance of the device is substantially facilitated due to the provision of pivotal movement of the unit 43.

The structure illustrated is carried by the chassis 69. The chassis 69 preferably comprises a cast component and is therefore very solid and robust. During the pivotal movement of the unit 43 the electrical connections between the circuits which are disposed in the structural unit 43 and the construction groups on the chassis 69 are maintained.

Figure 6:
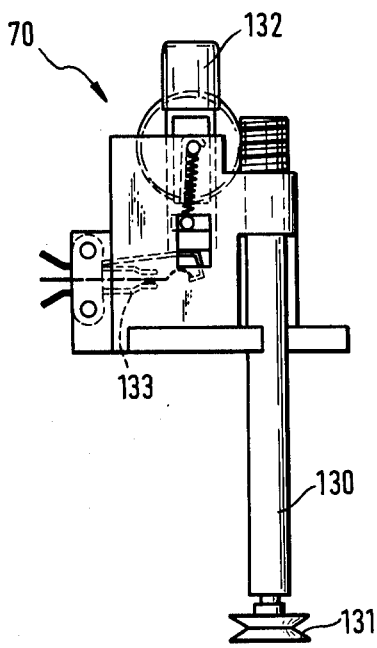
FIG. 6 shows a side view of a counting device.

FIGS. 3, 5 and 6 in particular also show that a counting mechanism 70 is driven by the spool motor 52 by way of a belt 45. The counting mechanism 70 has a counting mechanism shaft 130 which is rotated by means of a belt pulley 131 by the belt 45, by virtue of the rotary movement of the spool motor 52. The counting mechanism 70 is also provided with a switch, in particular a push-button switch 132 which, upon being depressed, actuates a contact 133 for nullifying the operating condition of rapid stop, which can be triggered by a control film disposed at the beginning of the magnetic tape. In this way it is possible for any desired section at the beginning of the magnetic tape, beyond the control film disposed at the beginning of the tape, to be wound onto the tape spool on the winding-on side. At the same time the counting mechanism 70 is held in its zero position by the switch 132. This arrangement avoids the necessity for the beginning of the magnetic tape, beyond the control film, to be wound by hand onto the tape spool disc on the winding-on side, before beginning the recording or reproducing operation. When the switch 132 is actuated, winding-on of the beginning of the magnetic tape is effected by the drive of the corresponding tape spool motor.

FIG. 5 also shows the electrical structural groups which belong to the mains connection portion. These are arranged on the underside of the chassis 69. These structural groups are provided on printed conductor plates 71 and 72. A transformer 73 also forms part of the mains connection portion.

When the tape deflection means changes over from one operating position to the other operating position, the following procedures occur:

It will first be assumed that the magnetic tape 1 and thus the tape deflection means are in the operating positions which corresponds to the stop or rewind mode. This position is diagrammatically shown in FIG. 4. For the sake of simplicity, only the structural components which are required for this description are shown in FIG. 4. In this operating position the magnetic tape 1 is moved at a spacing from the magnetic heads 46, 47, 53 and 78, and at a spacing from the capstan shaft 13. The device can be set for example to the "stop" mode, in which the magnetic tape 1 is also fitted into the device. As the magnetic tape 1 is guided in a straight line and is disposed at a spacing from the magnetic heads 46, 47, 53, 78, and from the capstan shaft 13, it is then easy to insert the magnetic tape 1. So that the tape 1 is held at a spacing from the capstan shaft 13, the guide pins 20, 16 and 5 are moved into such a position that the tape 1 lies against the guide pins 5, 16 and 20, in dependence on the position of the control disc 9 and thus the control surface 8.

If by means of the corresponding press key the device is set for example by reproduction, the geared motor 56 is correspondingly actuated and the control disc 9 is rotated in the clockwise direction, i.e in the direction indicated by the arrow A in FIG. 4. This causes the roller 49 and the pin 50 to be rotated from the stop or rewind position of FIG. 4, into the start position shown in FIG. 3. When this occurs, the magnetic tape 1 is then so guided that it is laid in a substantially $\Omega$-configuration about the capstan shaft 13.

At the same time the adjusting levers 4, 11, 14 and 17 are correspondingly pivoted, upon rotary movement of the control disc 9. The lever 4 is so displaced that the guide pin 5 is lifted away from the magnetic tape 1, and the tape contact roller 13a engages the magnetic tape 1 and applies it against the magnetic heads 46 and 47. The deflection pin 50 on the disc 9 also engages the magnetic tape 1 and applies it accordingly against the magnetic head 53.

In addition, the lever 14 is pivoted out of the position shown in FIG. 4, in which it is pressed against an abutment 79 by the force of the spring 60, in such a way that the pin 16 which is disposed thereon becomes disengaged from the tape 1. For this purposes a lever extension 80 is engaged by a base portion 81 at the foot of the pin 50 and the lever 14 is correspondingly displaced. The lever 17 is also so pivoted that the deflection pin 21 disposed thereon assumes the action of guiding the magnetic tape 1 so that the angle of running onto a deflection roller 35 of a sensing device 82 remains the same as in the first operating position as shown in FIG. 4. The sensing device 82 is part of a means for controlling and/or setting the tape tension on the winding-on side. The mode of operation of the sensing device 82 and a sensing device 83 which are part of the means for controlling and/or setting the tape tension will be described in greater detail hereinafter. The guide pin 21 is pivotal against the force of a spring (not shown) which is disposed at the underside of the lever 17, and the guide pin 21 can thus also act as a loop catcher.

While the deflection means, in particular the pins 5, 16, 20, 21 and 50 and the tape contacting roller 13a and the deflection roller 49 change over from one operating position into the other operating position, at the same time the pivotal lever 32 is so guided at the control surface of the control disc 22 that it is pivoted in a clockwise direction, that is to say, in the direction of the arrow B shown in FIG. 3, because of the force of a spring 34, so that the pivotal lever 24 also carries out a corresponding pivotal movement and the brake lining 28 is lifted away from the tape spool disc 65 which is on the winding-on side. This means that for example when changing from the stop or rewind position of FIG. 4 to the start position of FIG. 3, a corresponding section of tape can be wound off from the tape spool 3 in order to ensure that the magnetic tape 1 is looped in a $\Omega$-configuration about the capstan shaft 13. The other spool 2 or disc 64 is held firmly by the brake lining 27. This ensures that when changing between the two operating positions of FIGS. 3 and 4 the magnetic tape 1 maintains its position in front of the magnetic heads 46, 47, 53 and 78. As soon as the tape 1 has been looped in a $\Omega$-configuration, the pivotal lever 32 returns to its starting position, under the control of the control disc 22, and the brake lining 28 is again applied to the tape spool disc 65.

If the change is from the start position of FIG. 3 to the stop or rewind position of FIG. 4, the tape spool disc 65 is driven by the tape spool motor 52 so that the loose loop of tape resulting from the tape being looped in a $\Omega$-configuration about the capstan shaft 13 is wound on, and the magnetic tape 1 is passed taut and rectilinearly between the magnetic heads 46, 47, 53 and 78 and the capstan shaft 13, as shown in FIG. 4. In that case, obviously by virtue of the action of the pivotal lever 32 which has been correspondingly pivoted by way of the control disc 22 by the geared motor 56 which is also driven, the brake lining 28 has been lifted away from the tape spool disc 65.

In addition, switches 38, 39 and 40 are actuated by the slider member 33 which lies against the control surface of the control disc 32. The two switches 38 and 40 serve as limit switch-off means for the motor 56 on the one hand after terminating the change from the stop or rewind position into the start position and on the other hand as a limit switch-off when changing from the start position into the stop or rewind position. The middle switch 39 serves for silencing the device during the change from one operating mode to the other.

A tape fender 76 on the control disc 9 blocks off an insertion slot 77 (FIG. 1) for the tape 1, in the operating position of FIG. 3, in the vicinity of the capstan shaft 13. In addition, the tape fender 76 prevents the magnetic tape 1 winding about the capstan shaft 13 in the event of an operational defect.

Figure 7:
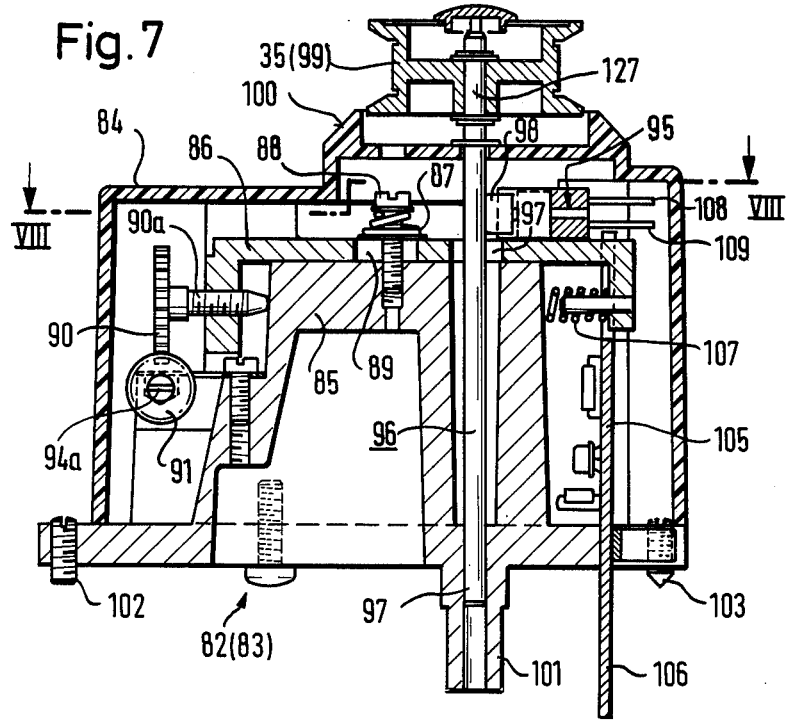
FIG. 7 shows a side view in cross-section of a sensing means for the means for controlling tape tension or for setting tape tension.
Figure 8:
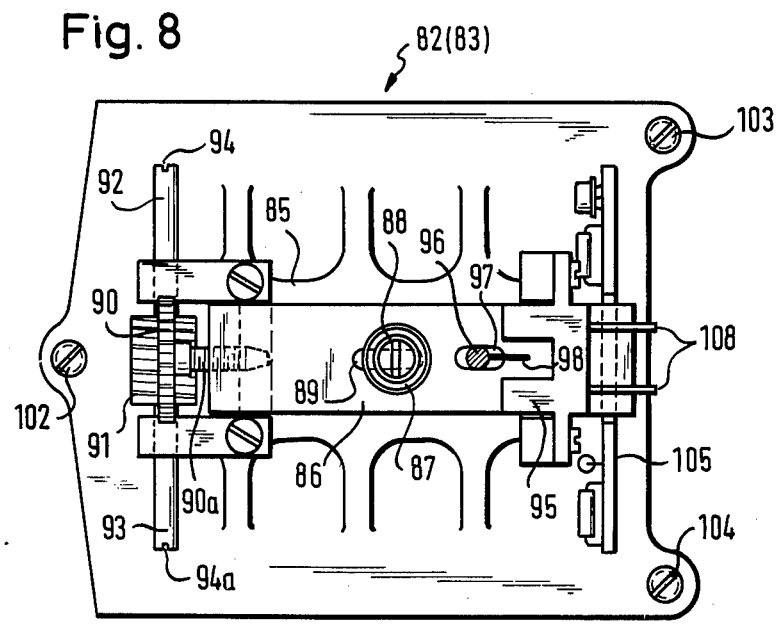
FIG. 8 shows a plan view of the sensing means of FIG. 7.
Figure 9:
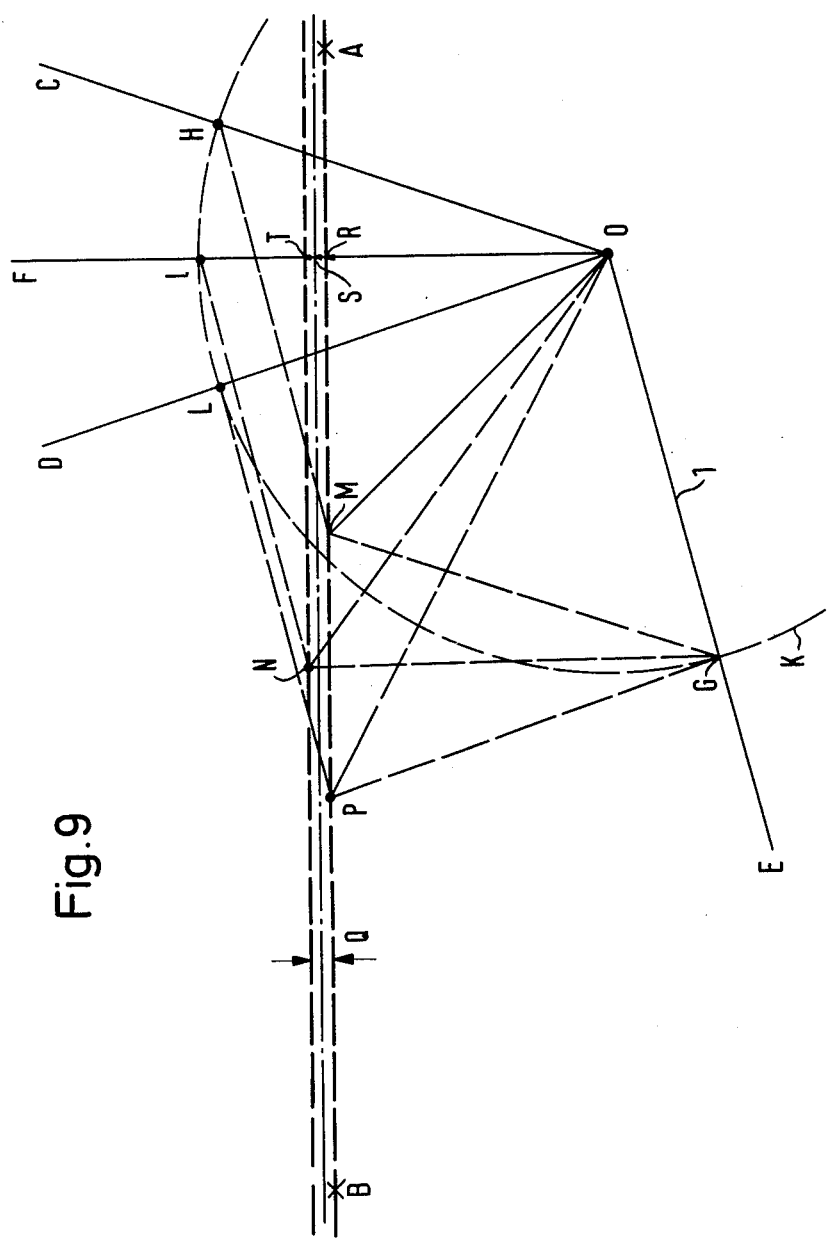
FIG. 9 shows a diagrammatic view of the tape path and the deflection of the guide element of the sensing means.

FIGS. 7, 8 and 9 show in detail the sensing devices 82, 83 for controlling and/or setting tape tension. In FIG. 9 reference 0 diagrammatically denotes the deflection point of the magnetic tape 1 running to the device 82 (FIG. 3). A run C of the magnetic tape 1 extends to the tape spool 3 on the winding-on side of the device, while a run E of the tape 1 is passed to the magnetic head system or the sound shaft 13.

The path of the run C corresponds to the path of the tape 1 when the spool is full. A tape path D corresponds to the path of the tape 1 when the tape spool is empty. FIG. 9 shows that the angle by which the tape 1 is looped about the roller 71 of the sensing device 82 shown in greater detail in FIGS. 7 and 8 varies. Reference F denotes the path of the tape 1 at half the diameter of the tape spool.

As has been seen, the resulting vectors of the forces which occur with various directions of tape run-on and run-off, at the deflection point, lie within a narrow region Q. The invention makes use of this recognition.

Referring to FIG. 9, the conditions at the winding-off side of the magnetic tape will now be described. Each tape spool diameter has a resultant M, N, P of the forces H, J, L with G. H, J, L, and G are the desired equal forces along the magnetic tape 1. FIG. 9 shows that the resultants M, N, and P change greatly in respect of magnitude and direction, with the tape spool diameter.

They are therefore not suitable for directly measuring tape tension, but only establish a narrow range Q.

The invention makes use of the fact to the effect that, for the purposes of controlling tape tension, it utilizes those components R, S and T of the resultants M, N and P, which are perpendicular to the longitudinal extent of the range Q. For this purpose it is sufficient to determine the resultants M and P at the beginning and the end of the angle, in order to obtain the straight line AB.

The same considerations also apply as regards thw winding-on side, that is to say at the roller 99 of the sensing device 83. Then, starting from the full tape spool diameter, the position of the deflection element of the sensing device in the sound tape device and the dimension of the empty tape spool, we then have a defined statement concerning the optimum direction of deflection for the guide element in the sensing device.

FIGS. 7 and 8 show one of the sensing devices 82, 83. The sensing device is disposed in a housing 84. A carriage 86 is guided on a support 85. The carriage 86 is pressed onto the support 85 by means of a spring 87 and a screw 88. The carriage 86 has a guide slot 89 through which the screw 88 extends.

The carriage 86 is displaced by means of a gearwheel 90 which can be set from the exterior by means of worm gear member 91. The member 91 has extensions 92 and 93, with means 94 and 94a for engaging the extension with a tool, for example a screw-driver, which can be inserted through an opening in the housing 84, in order to rotate the worm gear member 91 and to set the gearwheel 90. Rotation of the gearwheel 90 causes displacement of the carriage 86, by way of a screw-threaded pin 90a secured to the gearwheel 90.

Secured to the carriage 86 is a photoelectric transducer 95. The roller 35 (99) which forms the guide element of the sensing device is mounted on a shaft 96. The shaft 96 projects through a slot 97 into the photoelectric transducer 95. The direction of spread of the light beam of the photoelectric transducer 95 is parallel to the straight line A–B in FIG. 9. The slot 97 is of such a width that the shaft 96 can move freely at least in the direction of the resultants M, N and P. One end 97 of the shaft 96, being the lower end in FIG. 7, is stationarily mounted in the support 85 while the other end 127, the upper end in FIG. 7, is freely movable. The shaft 96 is provided with a shield member 98 which moves into the light beam of the photoelectric transducer 95, which can be in the form of a phototransistor. The depth of engagement of the shield member 98 into the light beam will depend on the deflection of the shaft 96 by virtue of the tape tension. The photoelectric transducer 95 then delivers a corresponding signal, depending on the depth of engagement of the shield member 98 into the light beam.

In order to facilitate insertion of the tape 1 into the guide roller 35 (99), the housing 84 is provided with a base portion which has a chamfer 100, which base portion and chamfer 100 embrace the lower guide edge of the roller 35 (99). This facilitates inserting the tape 1 into the guide channel of the roller 35 (99).

In order to facilitate setting the position of the sensing device in the magnetic tape device, the underside of the support 85 is provided with an extension 101. The sensing device can be set and fixed in its desired position in the magnetic tape device by means of three screws 102, 103 and 104 arranged at the corners of a triangle.

Also arranged within the housing 84 is a printed conductor plate 105 on which the control circuit is disposed. The printed plate 105 has a plug bar 106 which projects through the support 85; that is to say the plate 105 is of a plug-in construction.

In order to provide for precise displacement of the carriage 86 by means of the micrometer adjusting device 90, 91 and 90a, and thus precise pre-adjustment of the tape tension, the carriage 86 is supported against the support 85 by means of a spring 107, at the end of the carriage remote from the above-mentioned micrometer adjusting device.

Figure 10:
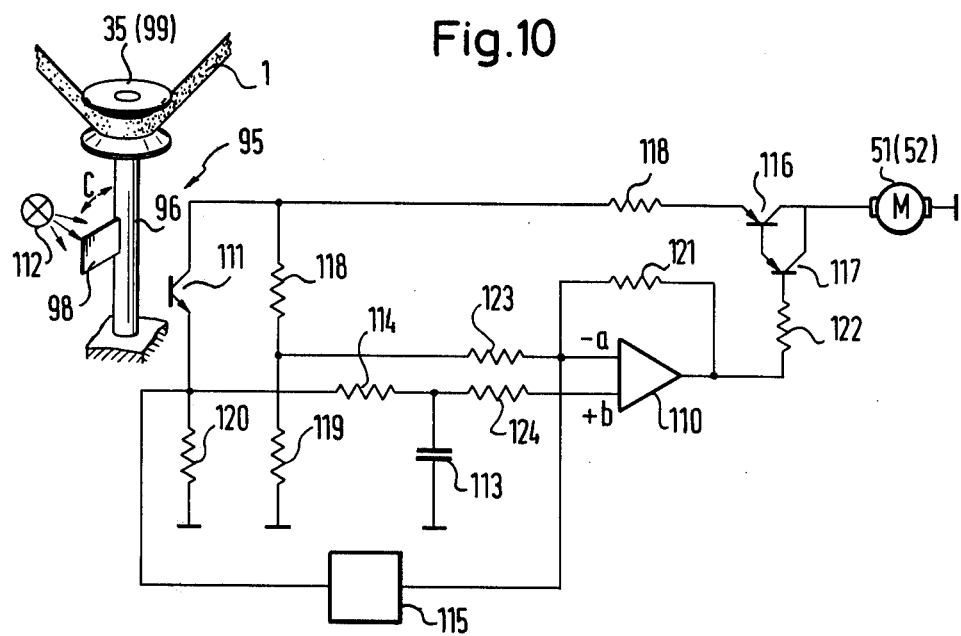
FIG. 10 shows a control device for controlling a pulling motor for tape tension control.

The electrical signals from the photoelectric transducer 95 are introduced into the control circuit shown in FIG. 10 on the printed conductor plate 105, by means of electric leads 108 and 109. Instead of the photoelectric transducer, it will be apparent that capacitive, electromagnetic transducers, extension measuring strips or piezoelectric crystals can also be used for determining the deflection of the shaft 96.

The control circuit shown in FIG. 10 for the tape tension control has an operational amplifier 110 as the control means. The operational amplifier 110 has an inverting input $a$ and a non-inverting input $b$. The photoelectric transducer 95 which converts the forces acting as a result of the tape tension into an electrical signal can have for example a phototransistor 111. The guide roller 35 (99) which is carried on the shaft 96 which is clamped fast at one end is used as the deflection element or pressure receiving means of the sensing device. The shaft 96 is provided with the shield member 98 which can move into the light beam of a light source 112. The light beam is directed onto the phototransistor 111. The transducer 95 produces a signal depending on the depth of engagement of the shield member 98 into the light beam. The signal produced by the transducer 95 is applied to the non-inverting input $b$ of the operational amplifier 110 by way of a frequency-dependent member 113, 114 which has a high time constant and which in the embodiment illustrated comprises a capacitor 113 and resistor 114. The higher-frequency signal variations resulting from the oscillations denoted by the double arrow C are not taken into account in this control circuit.

The higher-frequency signals delivered by the transducer 95 are applied to the inverting input $a$ of the operational amplifier 110 by way of a frequency-dependent member which is in the form of a band pass filter 115. This causes the higher-frequency signals of the transducer 95, which originate from the oscillations of the system comprising the magnetic tape 1, spool motors 51 and 52 respectively, guide roller 35 (99) and shaft 96, to be filtered out of the original signal. These higher-frequency signals lie within a given frequency range in respect of which the band pass filter 115 is transmissive. By virtue of the properties, which are predetermined by virtue of construction, of the oscillatory system comprising the magnetic tape 1, the motors 51 or 52, guide roller 35 (99) and shaft 96, the higher-frequency frequency range for the signals in respect of which the band pass filter 115 is transmissive is predetermined, and thus can be correspondingly adjusted. The output of the operational amplifier 110 correspondingly controls the tape spool motor 51 (52) by way of transistors 116 and 117, so that the controlled motor is subjected to variations in its torque, these variations counteracting the higher-frequency oscillations of the guide roller 35 or 99 respectively, about which the magnetic tape 1 is passed.

In the illustrated circuit the two inputs of the operational amplifier 110, that is to say, the inverting input $a$ and the non-inverting input $b$ are disposed in the zero diagonal of a bridge formed by resistors 118, 119, 120 and phototransistor 111. A negative feedback resistor 121 provides for defined amplification of the operation amplifier 110. The output signal of the operational amplifier 110 is transmitted by way of a current limiting resistor 122 to the transistors 116 and 117 and the motor 51 or 52 respectively. A current negative feedback resistor 118 provides for improvement in current stabilisation, by the transistors 116 and 117. A decoupling resistor 123 decouples the inverting input of the operational amplifier from the bridge, while a decoupling resistor 124 provides for decoupling RC-member 113 and 114.

FIG. 10 therefore shows a control circuit which, for the purposes of controlling tape tension, delivers a control parameter in dependence on the changing tape spool diameters, and which has a compensation circuit for taking into account the signal alterations which are caused by higher-frequency oscillations of the shaft 96, such oscillations resulting from the energy exchange as between the tape 1, the spool motor 51 (52), the guide roller 35 (99) and the shaft 96.

In the invention these oscillations are filtered out because of the high time constant of the RC-member 113 and 114 and are passed by way of the band pass filter 115 to the non-inverting input $b$ of the control device so that, by virtue of such signal alterations, changes in the torque of the spool motor 51 (52) which counteract the oscillations of the guide roller 35 (99) and the shaft 96 can be produced. The necessary stability of the system, required for constant tape tension control, is then achieved. The synchronisation properties are thereby substantially improved.

Figure 11:
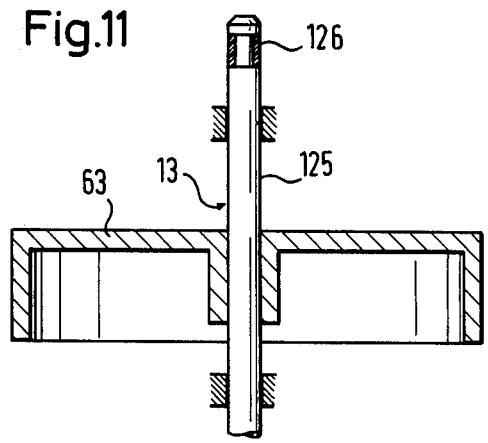
FIG. 11 shows a view in partial cross-section of a capstan shaft.

FIG. 11 shows a partial cross-sectional view through the capstan shaft 13. The shaft 13 substantially comprises a steel pin 125 which is encased with a friction coating 126 in the region in which the magnetic tape 1 lies against the capstan shaft. The steel pin 125 is connected to the inertia mass 63 in known manner. The friction coating 126 comprises a hard material, with for example a hardness of about 95–98 Short A, for example polyurethane elastomer, and has a smooth, in particular a ground surface. The friction coating 126 can be applied to the steel pin 125 in a recess, for example in an injection moulding operation. When the plastics material used for the friction coating 126 hardens, such material is subject to contraction so as to ensure that the friction coating material is securely bonded on the steel pin 125. It is obviously also possible for the friction coating 126 to be vulcanised onto the steel pin 125. The friction coating 126 on the pin 125 is then subjected to a finishing grinding operation so as to present a smooth surface.

With the capstan shaft 13 illustrated, it is possible to omit a pressure roller for pressing the magnetic tape to be transported against the capstan shaft. A sufficient drive force is achieved if the magnetic tape 1 loops around the capstan shaft 13 in a $\Omega$-configuration, as shown in FIG. 3.

We, therefore, particularly point out and distinctly claim as our invention:

1. An improved magnetic tape device comprising two tape spool supporting means, motors for driving the spool supporting means, brake means for braking each spool supporting means, magnetic heads for recording, reproducing and erasing information on the tape, a capstan for said tape, first guide means for guiding the tape around the capstan in the approximate shape of an $\Omega$-configuration, and second guide means for guiding the tape past the magnetic heads, a drive motor for driving the capstan, manually operable switches for setting the mode of operation of the device, wherein the improvement comprises a first control member, a control motor for moving the first control member between two operating positions, said two operating positions comprising a first operating position in which the tape can be stopped and rapidly wound forward or in reverse by the motors for driving the spool supporting means and in which the tape can be moved rectilinearly past the magnetic heads and capstan without contact therewith and a second operating position in which the tape is guided by the first and second guide means and lies against the magnetic heads for recording or reproducing and is engaged with the capstan in the approximate shape of an $\Omega$-configuration, wherein said first control member comprises a control disc, said capstan extending through said control disc at the center thereof, and said control disc being rotatable about said capstan between the two operating positions, wherein said first guide means is mounted on said disc for movement with said disc between said first operating position and said second operating position.

2. A device as claimed in claim 1, wherein the tape has a magnetisable coating on one side, and wherein said capstan is arranged to contact the side of the tape which is opposite from the side provided with the magnetisable coating.

3. A device as claimed in claim 1, in which said control disc has a toothed rim and is driven by means of an intermediate gearwheel by said control motor.

4. A device as claimed in claim 1, further comprising means for controlling the tape tension comprising a guide member upon which the tape is guided around, two guide pins for guiding the tape between the capstan and the guide member, one of said guide pins guiding the magnetic tape in said first operating position, the other of said guide pins guiding the magnetic tape in said second operating position, wherein the angle at which the magnetic tape coming from the magnetic heads encounters the guide member remains constant.

5. A device as claimed in claim 1 further comprising a second control member means for releasing the brake of one of the spool supporting means while the first and second guide means are being moved between their two operating positions.

6. A device as claimed in claim 1, in which the first guide means comprise a guide pin and a guide roller, which are movable between the first operating position, in which the magnetic tape is guided at a spacing between the capstan and the magnetic heads, into the second operating position in which the tape is laid in a $\Omega$-configuration about the capstan.

7. A device as claimed in claim 6, in which said guide pin and guide roller form a triangle with said capstan, and said control disc is pivotal within an angular range of from 150° to 180°.

8. A device as claimed in claim 1, in which the capstan is formed by a steel pin wherein the region of the steel pin upon which the magnetic tape lies is encased with a hard and smooth friction layer said friction layer comprises a plastics material which has a higher coefficient of friction than steel.

9. A device as claimed in claim 8, in which the friction layer comprises polyurethane.

10. A device as claimed in claim 1 wherein said control disc comprises a cam surface movable with said control disc, control lever means engaging said cam surface and pivoted by movement of said cam surface, said second guide means mounted to said control lever means.

11. A device as claimed in claim 10 wherein said second guide means comprises a roller wherein in said second operating position said roller engages said tape to move said tape to lie against the magnetic heads.

12. An improved magnetic device comprising two tape spool supporting means, motors for driving the spool sputtering means, brake means for braking each spool supporting means, magnetic heads for recording, reproducing and erasing information on the tape, a capstan for said tape, first guide means for guiding the tape around the capstan in the approximate shape of an $\Omega$-configuration and second guide means for guiding the tape past the magnetic heads, a drive motor for driving the capstan, manually operable switches for setting the mode of operation of the device, means for controlling the tension of the tape comprising a guide member and means for guiding the tape around the guide member wherein the improvement comprises said guide member comprising a spindle, one end of said spindle having a fixed and stationary mounting, a guide roller, means for rotatably supporting said guide roller on the other end of said spindle, said tape guided by said guide roller whereby the tension of the tape on said guide roller deflects the spindle, photoelectric transducer means for detecting the deflected movement of said spindle comprising a light beam means for propagating a beam of light, and a photoelectric sensing means for sensing the propagated beam of light, said beam of light extending transversely to a deflection component of the spindle, wherein the deflection component of said spindle lies transversely to a straight line which is formed by connecting the end points of two diagonals, said diagonals originating from the spindle and of which one diagonal lies in an equal-sided first parallelogram in which the two sides of the first parallelogram coincide with the tape path about the spindle when the tape spool is full, and the other diagonal lies in an equal-sided second parallelogram with the sides of the same length as the first parallelogram, wherein the two sides of the second parallelogram coincide with the tape path about the spindle when the tape spool is empty said photoelectric transducer means providing an electrical signal responsive to said deflection component, a control means for controlling the torque of the motors for driving the spool supporting means, said electrical signal provided to said control means.

13. A device as claimed in claim 12, wherein said spindle is provided with a shield which engages into the light beam of the photoelectric transducer as said spindle is deflected.

14. A device as claimed in claim 12, wherein said transducer means is mounted on a displaceable carriage, and means for moving said displaceable carriage parallel to the deflection component to be evaluated.

15. A device as claimed in claim 14 in which the component of the deflection of the guide element or the guide roller to be evaluated extends transversely to the direction of propagation of a light beam of a photoelectric transducer, the direction of propagation of the light beam coinciding with the straight line formed by the connecting line connecting the end points of the diagonals and the transducer is arranged displaceably parallel to the components to be evaluated of the direction of deflection of the guide element and the transducer is mounted on a displaceable carriage further comprising a micrometer adjusting device means for displacing the carriage.

16. A device as claimed in claim 12, wherein the control means comprises means for changing the torque of said motors for driving the spool supporting means comprising a band pass filter means for filtering high frequency signals resulting from oscillations of said spindle.

* * * * *